United States Patent [19]

Loeffler

[11] Patent Number: 4,805,471
[45] Date of Patent: Feb. 21, 1989

[54] MULTI-SPEED TRANSMISSION

[75] Inventor: John M. Loeffler, Toledo, Ohio

[73] Assignee: Dana Corporation, Toledo, Ohio

[21] Appl. No.: 100,952

[22] Filed: Sep. 25, 1987

[51] Int. Cl.<sup>4</sup> ............................ F16H 3/08; F16H 3/02
[52] U.S. Cl. ........................................ 74/333; 74/745; 74/331
[58] Field of Search ................. 74/359, 360, 331, 333, 74/745

[56] References Cited

U.S. PATENT DOCUMENTS

| 3,088,336 | 5/1963 | Fodrea | 74/333 X |
| 4,065,981 | 1/1978 | Whateley et al. | 74/331 X |
| 4,461,188 | 7/1984 | Fisher | 74/331 X |
| 4,693,129 | 9/1987 | Pierce | 74/333 |

FOREIGN PATENT DOCUMENTS 217556  5/1957  Australia ............... 74/745

Primary Examiner—Dirk Wright
Attorney, Agent, or Firm—Irvin L. Groh; Alfred L. Patmore, Jr.

[57] ABSTRACT

A multi-speed transmission having a main section for providing a plurality of gear ratios and a range section for selectively mulitplying a gear ratio provided by the main section in which the reverse idler gear is not located on a separate idler shaft. The reverse idler gear is mounted on the range countershaft. This is made possible by overlapping or rotating the plane containing the main countershaft and main shaft with respect to the plane containing the range countershaft and the main shaft. The reverse idlere gears are positioned to be driven by a set of gears on the main countershafts and they drive a gear on the main shaft. The same relationship exists for a multiple countershaft transmission with a reverse idler gear on each range countershaft.

15 Claims, 2 Drawing Sheets

MULTI-SPEED TRANSMISSION

BACKGROUND OF THE INVENTION

1. Field of the Invention

This invention relates to multi-speed transmissions and, more particularly, to a multi-speed transmissions having a main and range gear reduction section.

2. Description of the Prior Art

It is elementary that meshing gears rotate in opposite directions; that is, one will rotate in a clockwise direction and the other in a counter-clockwise direction. In a multi-speed transmission, the main shaft will have a number of ratio gears which are driven by meshing countershaft gears, and speed selection is made by clutching one of the main shaft ratio gears to the main shaft. If reverse direction is to be selected, the main shaft gear for reverse direction must be rotating in a reverse direction compared to the forward ratio gears. This requires the use of an idler gear between the driven countershaft gear and the main shaft gear. This in turn requires a separate shaft for mounting the reverse idler gear.

A separate shaft is used for mounting the reverse idler gear in both a single box transmission and a transmission having a main and range section wherein the main section provides a plurality of gear ratios, and the range section selectively multiples a gear ratio provided by the main section.

Separate shafts are also used for mounting the reverse idler gears in a single box transmission and a transmission having a main section and a range section wherein multiple countershafts are used. A separate shaft would be required for each countershaft of the multiple countershaft transmission.

In multi-speed automotive transmissions carrying heavy torque loads, the single countershaft transmission becomes quite large, and a multi-countershaft transmission becomes attractive to reduce size, carry heavier torque loads, increase gear life, and reduce costs.

In multiple countershaft transmission much effort has been expended on developing ways to insure even distribution of the torque load among the countershafts. This effort has been largely centered in attempts to allow the main shaft to float within limits so that it can seek its own center and distribute the torque load among the countershafts. In my co-pending patent application entitled "Twin Countershaft Transmission With Floating Main Shaft", filed concurrently herewith, on Sept. 25, 1987 as Ser. No. 101,065, and still pending a transmission with a fully floating main shaft is set forth.

While the multi-countershaft transmission has reduced the overall transmission size and complexity for a given torque rating and the twin countershaft transmission set forth in my aforementioned patent application has optimized such advantages, the inherent requirement of having separate shafts for the reverse idler gears has not heretofore been overcome.

SUMMARY OF THE INVENTION

The present invention provides a unique way of eliminating a separate auxiliary shaft for mounting the reverse idler gear. Elimination of the reverse idler shaft and its cost also eliminates the large bosses necessary to support the shaft which make the housing casting more complicated, heavier and more expensive because of the extra material and the extra machining required.

Simply stated, the invention comprises placement of the reverse idler gear on the range countershaft of a multi-speed transmission which has a main section for providing a plurality of gear ratios and a range section for selectively multiplying a gear ratio provided by the main section.

The main shaft and main countershaft are positioned so as to overlap the output shaft and range countershafts respectively, and they are so spaced for meshing of the reverse idler gears on the range countershaft with a gear on the main countershaft and also with a gear on the main shaft.

With a multiple countershaft transmission, the savings are even greater because each countershaft has required a separate shaft for the reverse idler gear.

As is conventional in multiple countershaft transmissions, the main section provides the plurality of gear ratios through sets of matched gears on at least two parallel main countershafts which mesh with gears on the main shaft located parallel to the countershafts. The range section has at least two parallel range countershafts which selectively drive the output shaft located parallel to the range countershafts from the range countershafts or directly from the main shaft. The range countershafts are driven from an output gear on the main shaft, usually termed the range drive gear, which meshes with gears affixed to the range countershafts. The relationship between the main countershafts and the range countershafts can be set forth in terms of rotating a plane containing a main countershaft and the main shaft about the axis of the main shaft in respect to a plane containing a range countershaft and the main shaft so as to provide meshing of the reverse idler gears on the range countershafts with a set of gears on the main countershafts and the meshing of the range countershaft gears with a gear on the main shaft.

In the preferred form, there are two main countershafts with the main shaft parallel and between the two main countershafts. Likewise, there would be two range countershafts in a plane with the output shaft, and the output shaft would be located between the two range countershafts. Also in the preferred form, the main shaft is floating, being supported only by the torque delivery gears. While the preferred embodiment of the invention is set forth in this floating main shaft environment, it can be practiced with other transmissions in which the main shaft is supported in another manner known in the prior art.

DRAWINGS

The preferred embodiments of the invention are illustrated in the drawing in which.

DETAILED DESCRIPTION OF PRESENTLY PREFERRED EMBODIMENT OF THE INVENTION

General Description, Main Section

Figure 1:
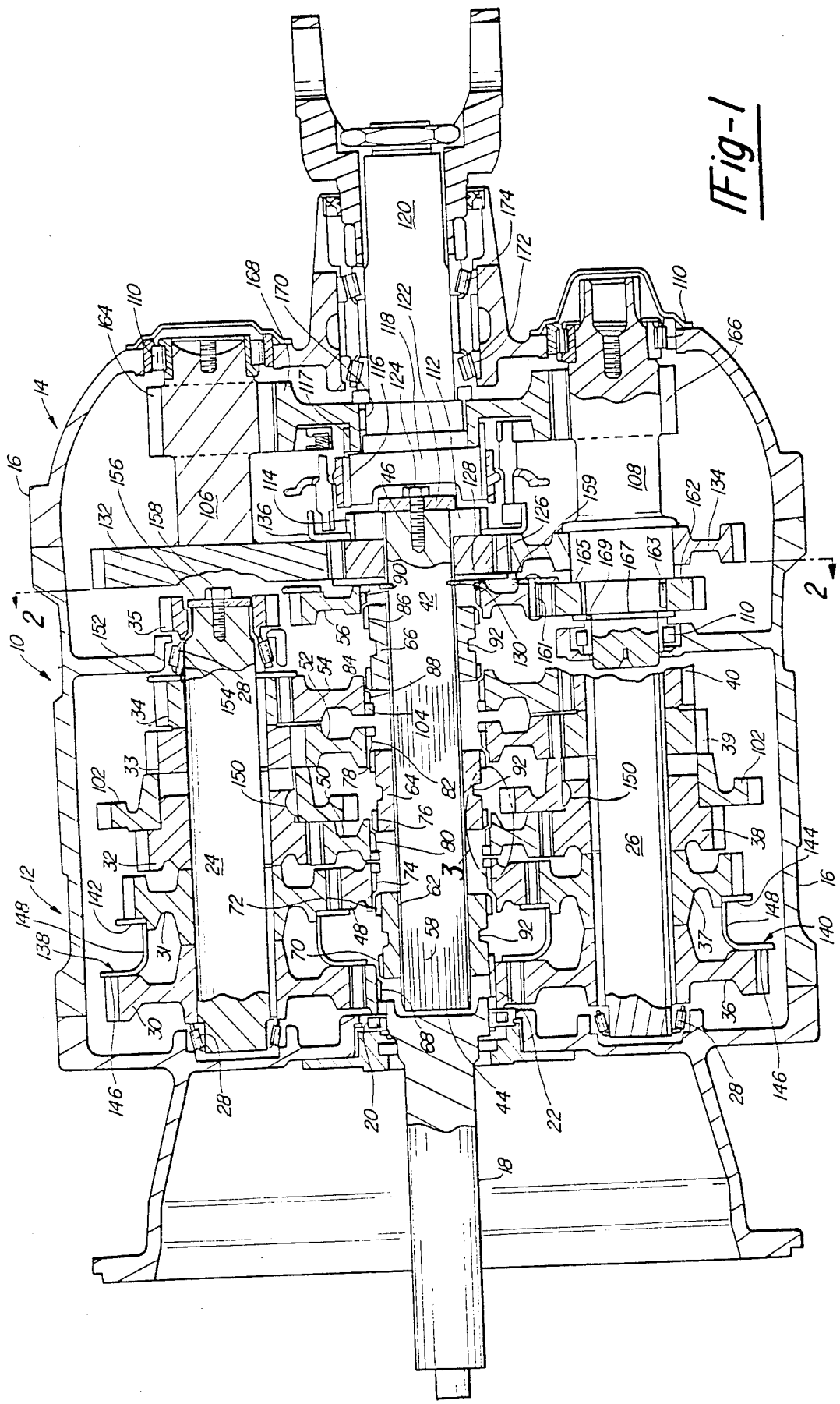
FIG. 1 is a horizontal section of the transmission embodying the invention in which portions are broken away to show the relationship of the main countershafts with the range countershafts.

The horizontal sectional view of the transmission as presented in FIG. 1 shows the input or head end of the transmission to the left and the output or rear end of the transmission to the right, and reference to the components of the transmission will be made in these terms. The multi-speed, multi-countershaft transmission 10 of this invention is shown as a twin countershaft transmission having a main section 12 and a range section 14 with a housing or casing structure 16 which can be end loaded for ease in assembly. The housing 16 is shown as a three part unitary structure with parital dividing walls for bearing supports, but independent housings could be used for the main section and range section.

Input shaft 18 is suitably journalled in housing 16 by roller bearing 20 and carries input driving gear 22 which is rigidly attached to the input shaft 18 by splines, or it could be integrally formed with the input shaft.

Parallel countershafts 24 and 26 are mounted for rotation within housing 16 being spacially fixed to the housing by tapered roller bearings 28 at each end of the countershaft. The full length of countershaft 24 is shown in FIG. 1, but the rear end of countershaft 26 is broken away to show the full length of a range countershaft to be discussed later.

The tapered roller bearings 28 at both ends of each countershaft 24 and 26 are take-apart bearings so that they may be pressed into position which is less likely to cause bearing damage than altenatively using permanently assembled bearings which are assembled by impacting blows on the bearings or by requiring special fixturing to press the bearings in position.

Countershaft 24 carries ratio gears 30, 31, 32, 33, 34, and 35 which are fixed to the countershaft for rotation with it. Countershaft gear 30 is a driven input gear. Countershaft gears 31, 32, 33, and 34 are forward driving gears, and countershaft gear 35 is a reverse driving gear.

Countershaft 26 has ratio gears 36, 37, 38, 39, 40, and 41 fixed to countershaft for rotation with it. Gears 36–41 are substantially identical to gears 30–35 respectively, with gear 36 being a driven input gear, gears 37, 38, 39, and 40 being forward driving gears and gear 41 being a reverse driving gear. Gear 41 is only seen in FIG. 2 because of the cut away in FIG. 1.

Floating main shaft 42 having an input end 44 and an output end 46 is located within the housing 16 between and parallel to the countershafts 24 and 26 and is generally aligned or coaxial with input shaft 18. Main shaft gears 48, 50, 52, and 54 surround main shaft 42 and are driven and supported by corresponding countershaft ratio gears. Main shaft gear 48 meshes with and is supported by countershaft gears 31 and 37; main shaft gear 50 meshes and is supported by countershaft gears 32 and 38; main shaft gear 52 meshes with and is supported by countershaft gears 33 and 39; and main shaft gear 54 meshes with and is supported by countershaft gears 34 and 40. Main shaft gear 56 is a reverse gear and is supported by reverse idler gears as will be explained later.

Engagement of Main Shaft Gears and Support of Forward End of Main Shaft

Main shaft 42 has external splines 58 which engage corresponding internal splines on clutch collars 62, 64, and 66 for rotation of the clutch collars with the main shaft. The clutch collars have external splines which drivingly engage internal splines in the main shaft gear. Input gear 22 also has an internal spline 68 which is engageable by external spline 70 on clutch collar 62 for direct drive of the main shaft from the input shaft. External spline 72 on the other end of clutch collar 62 is selectively engageable with internal spline 74 on main shaft gear 48. Likewise clutch collar 64 has external splines 76 and 78 at its opposite ends which are selectively engageable with internal splines 80 of main shaft gear 50 and internal splines 82 of main shaft gear 52. Similarly clutch collar 66 has external splines 84 and 86 at its opposite ends which are selectively engageable with internal splines 88 on main shaft gear 54 and internal spline 90 and main shaft gear 56.

Selective engagement of only one of the clutch collars 62, 64 and 66 at any one time with their adjacent main shaft or input shaft gear is effected by the conventional use of shift fork levers (not shown) which engage in grooves 92 on the clutch collars. Thus, main shaft 42 is driven from input shaft 18 having input driving gear 22 rigidly attached to drive meshing driven input gears 30 and 26 rotating countershafts 24 and 26, and their respective countershaft gears and meshing main shaft gears, by the main shaft gear which has been engaged to the main shaft by one of clutch collars 62, 64 and 66. With not bearing or other radial restraint, the engaged main gear will seek its own center between the two countershaft gears with which it is in mesh, distributing the torque load at the input end of the main shaft in an even, 50-50, manner between the two countershafts.

Neutral Condition Support of Forward End of Main Shaft

Figure 3:
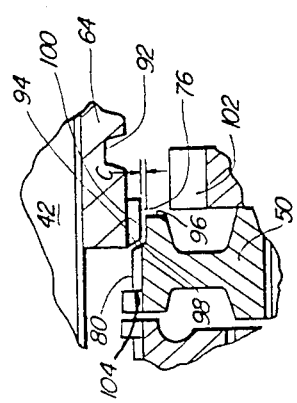
FIG. 3 is an enlargement of the encircled area 3 in FIG. 2.

As shown in FIG. 3, which is an enlargement of a portion of main shaft gear 50 and its associated clutch collar 64, the internal spline 80 on main shaft gear 50 commences with a chamfered surface 94 recesses in from the rear face 96 of the gear 50 which faces adjacent clutch collar 64. External spline 76 on clutch collar 64 commences with a chamfered surface 98 to facilitate engagement with the chamfered surface 94 on the internal spline 80 of main gear 50. Engagement of the main gear 50 to the main shaft 42 is accomplished when the collar is moved leftward or toward the input end of the main shaft.

The outside diameter of the clutch collar 64, that is, the outside diameter of external spline 76, extends inside the bore of main gear 50 creating the bearing area 100 in the recess of the bore when the transmission is in neutral with all of the clutch collars being disengaged from their adjacent main gears. This overlapping of the outside diameter of the clutch collar with the bore in the main shaft gear or input gear occurs for each clutch collar 62, 64, and 66 and their associated gears 22 and 48, 50 and 52, 54 and 56, respectively. The spacing between spline teeth on the clutch collars, that is the spacing between spline teeth 70, 72, 74, 76, 84, 86, acts as lubrication passages for oil to be supplied to the recess bearing area.

The clearance between the outside diameter of the clutch collar spline and the bore in the main gear can be reduced at any particular point such as the clearance 'c' between external spline 76 on clutch collar 64 and internal bore bearing area 100 in the recess on main gear 50 so that the input shaft is supported at that particular point when the transmission is in neutral. In the embodiment of the transmission shown in FIG. 1, the power take-off gears 102 are adjacent to main shaft gear 50. The large diameter of the power take-off gears 102 dip them deep into the oil sump of the transmission housing providing an abundant spray of oil on gear 50 and its overlapping clutch collar and main gear bearing area 100 for supporting the forward end of the main shaft when the transmission is in neutral.

Positive Clutch Collar Engagement

In the preferred embodiment of this invention, the splines on the clutch collars and main gears have a reverse taper so that as soon as a clutch collar is engaged with a main gear it will continue to draw the clutch collar into the main gear. The diameter of the spline teeth on the main gear is abruptly decreased at the desired point of maximum penetration of the clutch collar to act as a stop for the clutch collar. This is shown at 104 on main gear 50 in FIG. 3. The reverse taper is conventional in that the width of the spline teeth are at a maximum at the beginning chamfered surface 98 and decrease in width towards the center of the clutch collar with the corresponding configuration of the main gear splines so that the greatest backlash will occur in the fully engaged position of the clutch collar in the main gear.

Axial Location of Gears on Main Shaft

At the rear end of the main section 12 high range output clutch gear 112 is internally splined to main shaft 42. End washer 122 and bolt 124 restrains rearward movement of the clutch gear 112. Range drive gear 126 abuts against the input side of high range clutch 112. Thrust plate 128 in the form of a large diameter steel plate acts against the input end face of range drive gear 126, and thrust plate 128 is restrained from movement toward the input end by snap ring 130. Synchronizer cup 136 is trapped between high range clutch gear 112 and range drive gear 126 in a recess in the high range clutch gear itself.

Main shaft gears 48, 50, 52, and 54 are continually rotating through their mesh with the associated countershaft ratio gears but are not in contact with the main shaft 42 until they are engaged by their respective clutch collars as previously described. They are also free to move longitudinally along the main shaft 42 within their tolerance limits allowed by the respective thrust rings or plates.

Conventionally main shaft gears are restrained by thrust rings and snap rings located underneath the gears which causes a lubrication problem which is only partially solved by allowing more space between adjacent gears. With each of the main shaft gears operating at a different speed, a good amount of frictional heat and wear occurs here. The disadvantages associated with this type of positioning of the main gears is obviated in the present transmission.

The foregoing means for axially locating the driven main shaft gears include thrust rings which extend around the main countershafts in contact with the faces of the driving gears on the countershafts and their associated driven gear on the main shaft.

The thrust rings include thrust rings 138 and 140 surrounding countershafts 24 and 26 respectively which abut against the rear faces of countershaft input gears 30 and 36 and input driving gear 22 on input shaft 18. Thrust rings 142 and 144 surrounding countershafts 24 and 26 abut against the input faces of countershaft gears 31 and 37 and their meshing main shaft gear 48. The cooperation of thrust rings or collars 138 and 142 and the cooperation of thrust rings 140 and 144 establishes the spacing between the input gear 22 and the driven main shaft gear 48.

The thrust rings 138 and 140 are in the form of collars each having a radially extending annular portion 146 and a cylindrical axial extending portion 148. It will be appreciated that thrust rings 138 and 140 can be made from two separate parts, namely a separate axially extending and a separate radially extending portion or that the thrust rings 138 and 140 can be made as a unitary U-shaped thrust collar eliminating the need for separate thrust rings 142 and 144.

Main shaft gears 48 and 50 have abutting faces as does their meshing driving countershaft gears 31, 32, and 37, 38. Movement of main shaft gear 50 toward the output end is restricted by thrust rings 102 which take the form of power take-off gears on the countershafts 24 and 26. If power take-off gears were not offered as part of the transmission, thrust rings similar to 138, 142, and 140, 144 would be utilized in their place, and countershaft gears 38 and 39 would be moved into contact, and countershaft gears 32 and 33 would be moved into contact for gear stack-up. The power take-off gears 102 in this case are keyed by woodruff keys 150 to countershaft ratio gears 32 and 38 and thus are stationary with respect to those gears.

The output faces of power take-off gears 102 abut against the hubs of driving countershaft ratio gears 33 and 39 and main shaft gear 52 to establish the spacing between main shaft gears 50 and 52.

Main shaft gears 52 and 54 have abutting faces as do their meshing driving countershaft gears 33 and 34 on countershaft 24 and driving gears 39 and 40 on countershaft 26. Thrust rings 152 seating against shoulders 154 on countershafts 24 and 26 (only visible in FIG. 1 on countershaft 24) press against the output side of countershaft gears 34 and 40 and extend radially down to position main shaft driven gears 52 and 54 by contact with the rear face of main gear 54. Thrust rings 152 are held in position by tapered roller bearings 28 at the back or output end of the countershafts.

Reverse gears 35 and 41 are held against rearward movement on countershafts 24 and 26 respectively by washers 156 and bolts 158 attached to the output face of countershafts 24 and 26. Reverse gears 35 and 41 abut against tapered roller bearings 28 to restrict movement toward the input end on the countershafts 24 and 26.

Main shaft reverse gears 56 has a thrust ring 159 attached to its rear face by rivets 161 which extends radially outward to engage the rear side of reverse idler gears 160 and 162 on range countershafts 106 and 108 thereby restricting movement of main shaft reverse gear 56 toward the input end. The hub of main shaft reverse gear 56 abuts against thrust plate 128 restricting movement of main shaft reverse gear 56 toward the output end.

General Description—Range Section

In the range section 14 of the transmission, a pair of spaced parallel range countershafts 106 and 108 are mounted to the housing 16 by roller bearings 110 located at each end of the range countershafts to spatially fix them for rotation therein.

Figure 2:
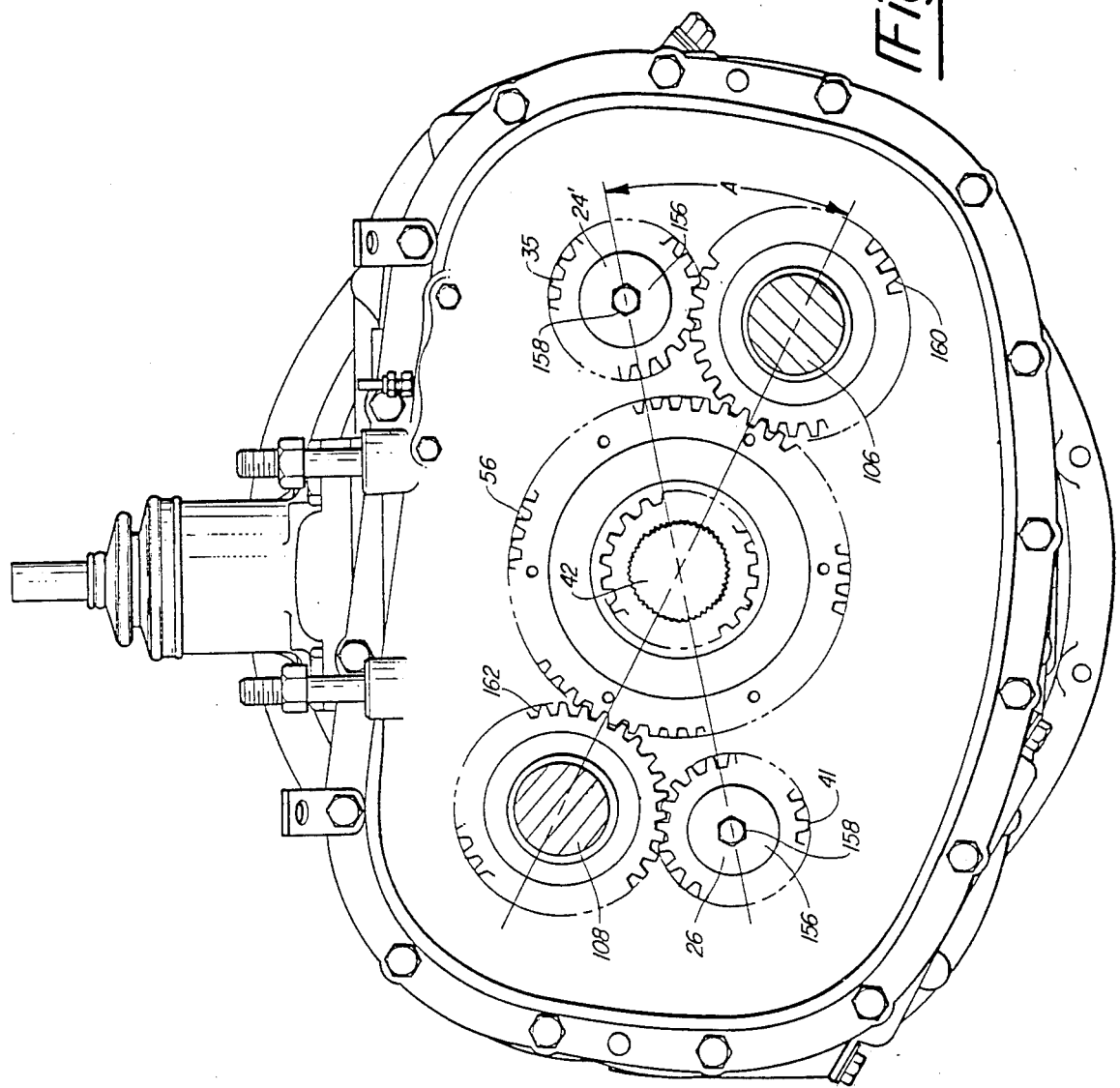
FIG. 2 is a section taken on line 2—2 of FIG. 1 showing the location of the reverse idler gears on the range countershafts and their mesh with driving gears on the main countershafts and their mesh with a driven gear on the main shaft in accordance with the teachings of this invention.

The range countershafts 106 and 108 overlap the main countershafts 24 and 26 as shown in FIG. 1 by the breakaway sections wherein the full length of main countershaft 24 is shown, and the full length of range countershaft 108 is shown. This overlap can be depicted by the angle "A" between the plane containing the main countershafts and the plane containing the range countershafts as shown in FIG. 2.

Range countershaft input gears 132 and 134 are keyed or welded to range countershaft 106 and 108 and are in meshing engagement with the range drive gear 126 on main shaft.

Low range driving gears 164 and 166 are rigidly mounted or formed integrally with range countershafts 106 and 108.

The output shaft 120 is spatially fixed for rotation to housing 16 by tapered roller bearings 172 and 174. Output shaft 120 carries low range output gear 168 mounted thereon by needle bearing 170, and low range output gear 168 is in constant mesh with low range driving gears 164 and 166. Output shaft 120 is externally splined to cooperate with internal splines on range clutch collar 118 for rotation of the clutch collar with the output shaft. Clutch collar 118 has splines 116 for selective engagement with external splines 114 on high range output clutch gear 112 when the clutch collar is moved to the left toward the input end or engagement with splines 117 on low range output gear 168 when the clutch collar is moved to the right toward the output end.

Engagement of the high range output gear 112 directly connects main shaft 42 with output shaft 120 for higher speeds, and engagement of low range output gear 168 drives the output shaft through range drive gear 126 on the main shaft, range countershaft input gears 132 and 134 and low range driving gears 164 and 166 on range countershafts 106 and 108 for lower speeds.

Roller bearings 110 at each end of the range countershafts like tapered roller bearing 28 are also take-apart bearings for ease in assembly and less possibility of assembly damage.

Axial Location of Main Shaft

Thrust ring 128 acts against the head end or input end face of range gears 132 and 134 as well as the input face of the low range output gear 126. Sychronizer cup 136 trapped between high range clutch gear 112 and low range output gear 126 extends radially outward to that abut against the output side of range input gears 132 and 134 as well as the output face of low range output gear 126. Thus, the axial position of main shaft 42 is determined from means associated with the range countershafts, and that means includes thrust ring 128 and synchronizer cup 136.

Support of Output End of Main Shaft

The output end of the main shaft is not supported in the customary manner by a roller bearing but is externally supported in a line by input range countershaft gears 132 and 134 as they are being driven by the range drive gear 126.

The low range drive output gear 168 being held on the journalled output shaft 120 acts as a timing gear in mesh with the pair of low range driving gears 164 and 166 on range countershafts 106 and 108, and the range countershaft input gears 132 and 134 align the gear 126 precisely locating the output end of the floating main shaft.

With the input end of the main shaft being self aligned and supported by the pair of countershaft gears meshing with the selectively clutch main shaft gear, a true 50-50 torque split is accomplished between the two main countershafts. The full floating main shaft 42 is positioned by movement between the two countershafts 24 and 26 only by gears carrying the torque.

Reverse Idler Gear Location

As best shown in the lower right hand corner of FIG. 1 as to the mounting of reverse idler gear 162 on countershaft 108, reverse idler gears 160 and 162 are mounted on countershafts 106 and 108 respectively on needle bearings 163. They are held against movement toward the output end by shoulders 165 on the countershafts and against movement toward the input end by rings 167 affixed to the countershafts 106 and 108 for rotation therewith by pins 169.

The spacing between the planes containing the range countershafts and the plane containing the main countershafts has been selected so that reverse idler gears 160 and 162 can mesh with reverse driving gears 35 and 41 on countershafts 24 and 26. As seen in FIG. 2, this can be depicted as an angle "A" between the plane containing the range countershafts and a plane containing the main countershafts. Main shaft reverse gear 56 is continually driven by its engagement with the reverse idler gears 160 and 162 on range countershafts 106 and 108 which in turn are driven by driving ratio gears 35 and 41 on countershafts 24 and 26. This eliminates the need for independent reverse idler gear shafts with a corresponding savings in space and cost.

It will be readily apparent that with a single countershaft transmission only one range countershaft will be used with a single reverse idler gear mounted thereon. The overlap of the main countershaft and range countershaft and the angular relationship of a plane containing the main shaft and the main countershaft with a plane containing the main shaft and the range countershaft will be the same angle "A" set forth above.

The embodiments of the invention in which an exclusive property or privilege is claimed are defined as follows:

1. In a multi-speed transmission having main and range sections with the main section providing a plurality of gear ratios through gears on at least one main countershaft meshing with gears on a main shaft located parallel to said one main countershaft; and the range section selectively multiplying a gear ratio provided by the main section, with at least one range countershaft driven from said main shaft, and means for selectively driving an output shaft located parallel to said one range countershaft from said one range countershaft or directly from the main shaft, the improvement comprising: at least one reverse idler gear, on said one range countershaft, aligned and being driven by a gear on said one main countershaft and aligned and driving one of said gears on the main shaft.

2. The transmission according to claim 1 wherein said one main countershaft and said one range countershaft overlap each other and are spaced for driving the reverse idler gear on said one range countershaft with a gear on said one main countershaft, and the reverse idler gear driving a gear on the main shaft.

3. The transmission according to claim 1 wherein a plane containing said one main countershaft and the main shaft is non parallel to a plane containing said one range countershaft and the main shaft for driving the reverse idler gear on said one range countershaft with a gear on said one main countershaft and the reverse idler gear driving a gear on the main shaft.

4. The multi-speed transmission according to claim 1 wherein there are at least two parallel main countershafts having sets of matched gears which mesh with the gears on the main shaft; there are at least two parallel range countershafts driven from the main shaft; the output shaft is selectively driven from said range countershafts or directly from said main shaft; and there are at least two reverse idler gears, one on each range countershaft, aligned and being driven by a set of gears on said main countershafts and aligned and driving one of said gears on the main shaft.

5. The transmission according to claim 4 wherein said main countershafts and said range countershafts overlap each other and are spaced for driving the reverse idler gears on the range countershafts with a set of gears on the main countershafts and the reverse idler gears driving a gear on the main shaft.

6. The transmission according to claim 4 wherein a plane containing a main countershaft and the main shaft is non parallel to a plane containing a range countershaft and the main shaft for driving the reverse idler gears on the range countershafts with a set of gears on the main countershafts and the reverse idler gears driving a gear on the main shaft.

7. In a twin countershaft multi-speed transmission having main and range sections with the main section providing a plurality of gear ratios through pairs of matched gears on two parallel main countershafts meshing with gears on a main shaft located parallel to and between the countershafts; and the range section selectively multiplying a gear ratio provided by the main section, with a pair of parallel range countershafts driven from said main shaft, and means for selectively driving an output shaft located parallel and between the range countershafts from the countershafts or directly from the main shaft, the improvement comprising: a pair of reverse idler gears, one on each range countershaft, aligned and being driven by a pair of gears on said main countershafts and aligned and driving one of said gears on the main shaft.

8. The transmission according to claim 7 wherein said main countershafts and said range countershafts overlap each other and are spaced for driving the reverse idler gears on the range countershafts with a set of gears on the main countershafts and the reverse idler gears driving a gear on the main shaft.

9. The transmission according to claim 7 wherein a plane containing a main countershaft and the main shaft is non parallel to a plane containing a range countershaft and the main shaft for driving a reverse idler gears on the range countershafts with a set of gears on the main countershafts and the reverse idler gears driving a gear on the main shaft.

10. In a multi-speed transmission including:
at least one main countershaft spatially fixed for rotation;
means for supplying input power to said one main countershaft;
a main shaft parallel to said one main countershaft;
a plurality of gears fixed for rotation with said one countershaft and a plurality of gears on said main shaft aligned to be driven by said countershaft gears;
means for selectively clutching one of said main shaft gears into driving relationship with said main shaft;
a range drive gear fixed for rotation with said main shaft;
at least one range countershaft spatially fixed for rotation;
a plurality of gears on said one range countershaft, one of said gears being driven by said range drive gear;
an output shaft parallel to said one range countershaft;
at least one gear on said output shaft clutchable to said output shaft for driving said output shaft and aligned to be driven by a gear on said one range countershaft;
the improvement comprising:
at least one reverse idler gear on said one range countershaft, aligned and driven by a gear on said one main countershaft and aligned and driving one of said gears on the main shaft.

11. The transmission according to claim 10 wherein said one main countershaft and said one range countershaft overlap each other and are spaced for driving the reverse idler gear on said one range countershaft with a gear on said one main countershaft and the reverse idler gear driving a gear on the main shaft.

12. The transmission according to claim 10 wherein a plane containing said one main countershaft and said main shaft is non parallel to a plane containing said one range countershaft and said main shaft for driving the reverse idler gear on said one range countershaft with a gear on said one main countershaft and driving a gear on the main shaft.

13. The transmission according to claim 10 wherein said one reverse idler gear is mounted on said one range countershaft on an anti-friction bearing for rotation relative to said one range countershaft.

14. A twin countershaft multi-speed transmission comprising, in combination:
a housing;
a pair of spaced parallel main countershafts mounted for rotation within said housing and being spatially fixed therein;
means for supplying input power to both of said main countershafts;
a plurality of pairs of driving gear including a pair of reverse driving gears mounted on said main countershafts, each gear of a pair being substantially identical and in opposing locations on each main countershaft;
a main shaft having an input and an output end located within said housing between and parallel to said main countershafts and having its output end extending beyond said main countershafts;
a plurality of driven gears located on said main shaft including a reverse driven gear, one for each pair of driving gears and driven thereby;
means for selectively clutching one of said driven gears into driving relationship with said main shaft;
a range drive gear affixed at the output end of said main output shaft;
a pair of range countershafts mounted for rotation within said housing and being spatially fixed therein, each having a substantially identical input gear affixed thereto aligned in a plane to be driven by said range drive gear; and
a pair of reverse idler gears located on said range countershafts, each gear being substantially identical and in opposing locations on each of said range countershafts, said reverse idler gears engaging and being driven by said reverse driving gears and engaging and driving said reverse driven gear.

15. A multi-countershaft multi-speed transmission comprising, in combination:

a housing;

a plurality of equally spaced parallel main countershafts mounted for rotation within said housing and being spatially fixed therein;

means for supplying input power to said main countershafts;

a plurality of sets of driving gears including a set of reverse driving gears mounted on said main countershafts, each gear of a set being substantially identical and in aligned locations on each main countershaft;

a main shaft having an input and an output end located within said housing centered and parallel to said main countershafts and having its output end extending beyond said main countershafts;

a plurality of driven gears located on said main shaft including a reverse driven gear, one for each set of driving gears and driven thereby;

means for selectively clutching one of said driven gears into driving relationship with said main shaft;

a range drive gear affixed at the output end of said main output shaft;

a plurality of equally spaced range countershafts mounted for rotation within said housing and being spatially fixed therein, each having a substantially identical input gear affixed thereto aligned in a plane to be driven by said range drive gear; and a set of reverse idler gears located on said range countershafts, each gear being substantially identical and in aligned locations on each of said range countershafts, said reverse idler gears engaging and being driven by said reverse driving gears and engaging and driving said reverse driven gear.

* * * * *